United States Patent
Hamasaki et al.

(10) Patent No.: US 8,228,012 B2
(45) Date of Patent: Jul. 24, 2012

(54) CONTROLLER OF MULTI-PHASE ELECTRIC MOTOR

(75) Inventors: Masamitsu Hamasaki, Kasugai (JP); Shinichi Kuratani, Kasugai (JP); Takenobu Nakamura, Kani (JP)

(73) Assignee: OMRON Corporation, Kyoto (JP)

( * ) Notice: Subject to any disclaimer, the term of this patent is extended or adjusted under 35 U.S.C. 154(b) by 724 days.

(21) Appl. No.: 12/277,025

(22) Filed: Nov. 24, 2008

(65) Prior Publication Data

US 2009/0134822 A1    May 28, 2009

(30) Foreign Application Priority Data

Nov. 26, 2007   (JP) ................................ 2007-304091

(51) Int. Cl.
*H02P 6/16* (2006.01)
*H02P 21/00* (2006.01)
*H02P 27/00* (2006.01)
*G05B 11/28* (2006.01)
*H02M 1/14* (2006.01)
*H02H 5/04* (2006.01)
*H02H 1/00* (2006.01)

(52) U.S. Cl. ......... 318/400.04; 318/400.02; 318/400.32; 318/599; 318/811; 363/41; 361/23; 361/131

(58) Field of Classification Search ............. 318/400.04, 318/400.02, 400.32, 599, 811; 363/41; 361/23, 361/131
See application file for complete search history.

(56) References Cited

U.S. PATENT DOCUMENTS

| | | | |
|---|---|---|---|
| 4,691,269 A * | 9/1987 | Yamane et al. ................. | 363/41 |
| 6,049,474 A | 4/2000 | Platnic | |
| 6,121,736 A * | 9/2000 | Narazaki et al. ......... | 318/400.35 |
| 6,674,258 B2 * | 1/2004 | Sakai et al. ............... | 318/400.28 |
| 6,724,166 B2 * | 4/2004 | Narumi et al. ............ | 318/400.23 |
| 6,735,537 B2 * | 5/2004 | Liu et al. ........................... | 702/64 |
| 6,914,409 B2 * | 7/2005 | Nukushina ..................... | 318/800 |
| 6,969,963 B2 * | 11/2005 | Sakai et al. ............... | 318/400.27 |
| 7,049,778 B2 * | 5/2006 | Katanaya ................. | 318/400.04 |

(Continued)

FOREIGN PATENT DOCUMENTS

CN    1983795 A    6/2007

(Continued)

OTHER PUBLICATIONS

Office Action in Japanese Patent Application No. 2007-304091, Dated Sep. 20, 2011 (4 Pages with English Translation).

(Continued)

*Primary Examiner* — Walter Benson
*Assistant Examiner* — Gabriel Agared
(74) *Attorney, Agent, or Firm* — Osha Liang LLP

(57) ABSTRACT

A controller of a multi-phase electric motor has a drive section having an upper arm switching element and a lower arm switching element for driving the multi-phase electric motor, a single current detection section for detecting a current value of the multi-phase electric motor, a pulse width modulation signal generation section for generating plural pulse width modulation of each phase within one control period based on the current value detected by the current detection section and a carrier signal, and a phase movement section for moving the pulse width modulation signal of a predetermined phase generated by the pulse width modulation signal generation section by gradually changing a movement amount of the phase in one control period, and outputting the resultant pulse width modulation signal to the drive section.

8 Claims, 8 Drawing Sheets

U.S. PATENT DOCUMENTS

| | | | |
|---|---|---|---|
| 7,071,640 B2 * | 7/2006 | Kurosawa et al. | 318/400.04 |
| 7,102,322 B2 * | 9/2006 | Suzuki | 318/801 |
| 7,193,388 B1 * | 3/2007 | Skinner et al. | 318/811 |
| 7,336,047 B2 | 2/2008 | Ueda et al. | |
| 7,852,032 B2 * | 12/2010 | Azuma | 318/599 |
| 7,893,638 B2 * | 2/2011 | Akama et al. | 318/400.14 |
| 7,952,310 B2 * | 5/2011 | Hamasaki | 318/432 |
| 2005/0046369 A1 * | 3/2005 | Kobayashi et al. | 318/432 |
| 2009/0146590 A1 * | 6/2009 | Hamasaki | 318/400.02 |

FOREIGN PATENT DOCUMENTS

| | | |
|---|---|---|
| JP | 63-073898 A | 4/1988 |
| JP | 2540140 B2 | 7/1996 |
| JP | 09-191508 A | 7/1997 |
| JP | 10-155278 A | 6/1998 |
| JP | 2001-095279 A | 4/2001 |
| JP | 2002291284 A | 10/2002 |
| JP | 2005-531270 A | 10/2005 |
| JP | 2007-112416 A | 5/2007 |

OTHER PUBLICATIONS

English Patent Abstract of JP 2002-291284, Date of Publication: Oct. 4, 2002 (1 Page).

* cited by examiner

CONTROLLER OF MULTI-PHASE ELECTRIC MOTOR

BACKGROUND OF THE INVENTION

1. Technical Field

The present invention relates to a pulse width modulation (PWM) drive control of a multi-phase electric motor such as a three-phase brushless motor. In particular, the present invention relates to a noise prevention technique of a controller of a multi-phase electric motor arranged with a single current detector between a drive circuit for PWM driving and a direct current (DC) power supply (high voltage side or low voltage side).

2. Related Art

In a controller for driving a multi-phase electric motor such as a three-phase brushless motor, a PWM signal for determining ON/OFF timing of a switching element for driving the multi-phase electric motor is generated by comparing a carrier wave of saw-tooth shape or triangular shape (saw-tooth signal, triangular signal) and a duty set value corresponding to a target current value in each phase of the multi-phase electric motor. That is, whether the PWM signal is high level or low level is determined depending on whether a value (value of PWM counter) of the saw-tooth signal or the triangular signal is greater than or equal to, or smaller than a duty set value.

The time interval in time of switching between one phase and another phase sometimes becomes very small in the controller of the multi-phase electric motor for generating the PWM signal based on the saw-tooth signal and the triangular signal, and driving the multi-phase electric motor. In this time, since the current is not stable due to the switching time of an electric field effect transistor of the drive circuit, the presence of dead zone (dead time), and also the response delay of an electronic processing circuit, the measurement of an accurate current value by a current detector cannot be carried out during such a period.

For instance, when using an A/D converter for the current detector, an accurate current value cannot be detected unless a stable signal is continuously inputted for at least 2 μs according to the specification of the A/D converter. If the input signal is not stably inputted continuously for 2 μs, the A/D converter cannot detect an accurate current value of each phase.

In a vehicle steering device described in Japanese Unexamined Patent Publication No. 2007-112416, a single current sensor for detecting the current value flowing through a current path is arranged on the current path between a motor drive circuit and a ground, and a phase of a saw-tooth wave for generating the PWM signal of each phase is shifted to shift the timing of fall of the PWM signal of each phase to the low level. A value of a U-phase current flowing through the electric motor is then obtained based on an output signal of the current sensor during a period in which a predetermined time has elapsed from when the PWM signal of a V phase fell to the low level. A total current value of the U-phase current and a V-phase current flowing through the electric motor is obtained based on an output signal of the current sensor during a period in which a predetermined time has elapsed from when the PWM signal of a W phase fell to the low level.

In a method of controlling a three-phase or multi-phase inverter described in Japanese Unexamined Patent Publication No. 10-155278, if the time interval between the switching of a transistor of one phase and the switching of a corresponding transistor of the next phase is smaller than a predetermined threshold value within a PWM period, the measurement is prohibited, the PWM signal defining the measurement time interval of sufficient duration is generated, and the influence of switching on a line current can be measured. The duration of the other PWM signals of the same dependent period is reduced by a certain value, and the sum of reduction of such other PWM signals is obtained to compensate for the amount of increase of the PWM signal defining the measurement interval.

A drive system for a three-phase brushless AC motor described in Japanese Unexamined Patent Publication No. 2005-531270 is configured to optimize a transistor switching pattern in order to enhance the power output while enabling the measurement of the current in all phases using a single sensor. This is realized by defining a voltage demand vector x in a case where three or more states are required to satisfy a minimum state time requirement determined by the single sensor method, and calculating the three or more state vectors for generating the request vector x while still allowing the single current detection.

In a method of monitoring a brushless motor capable of compensating some kind of drift in an output signal during a motor operation described in Japanese Unexamined Patent Publication No. 2001-95279, the current flowing into or flowing out from each winding of the motor is monitored and an output signal displaying the current is generated using a current measurement section, the output of the current measurement section is measured when an instantaneous current flowing through the current measurement section is known to be substantially zero, and a correction output signal for compensating some kind of difference between an actual measurement output signal value and an ideal output signal value is generated.

In U.S. Pat. No. 6,735,537, a triangular signal is used for a carrier wave, terms h phase, m phase, and l phase are used in place of the terms U phase, V phase, and W phase, where the time interval between the h phase and the m phase is represented as t1 and the time interval between the m phase and the l phase is represented as t2. As shown in FIG. 7 of U.S. Pat. No. 6,735,537, the process of Case 2 is performed when the time intervals t1, t2 are both smaller than a threshold value (mw). The process of Case 3 or Case 4 is performed when either one of the time intervals t1, t2 is smaller than the threshold value (mw). In the case of the process of Case 2 (see FIG. 13), the Duty maximum phase is shifted to the left side, and the Duty minimum phase is shifted to the right side (see FIG. 12B). If in the case of the process of Case 3 (see FIG. 15), and determined that only one phase needs to be shifted (N of step 148), the Duty maximum phase is shifted to the left side (see FIG. 14B). If in the case of the process of Case 4 (see FIG. 17), and determined that only one phase needs to be shifted (N of step 166), the Duty minimum phase is shifted to the left side (see FIG. 16B).

When the time interval in time of switching between one phase and another phase is small, the time interval in time of switching between one phase and another phase becomes large by performing a correction of shifting the phase of a predetermined phase, and an accurate current value of each phase of the multi-phase electric motor can be detected using the single current detector. However, if the frequency of the ON/OFF of the switching element for driving the multi-phase electric motor is included in an audible frequency as a result of performing the shift correction, it is heard by the user as noise and gives the user an unpleasant feeling.

For instance, in the control method of Japanese Unexamined Patent Publication No. 10-155278, a control frequency and the corrected current ripple frequency are the same when the PWM signal is corrected. In the control method of Japanese Unexamined Patent Publication No. 10-155278, a control cycle time (period) is 400 μs, and thus the control frequency and the corrected current ripple frequency become 2.5 kHz. The current ripple is generated in time of switching by turning ON/OFF the switching element based on the corrected PWM signal. If the frequency of the current ripple is included in the audible region, it is heard by the user as noise and gives the user an unpleasant feeling. Humans are able to feel the sound normally from about 20 Hz to 15 kHz or from about 20 Hz to 20 kHz, which differs among individuals, and such frequency band is referred to as the audible region. That is, the noise is generated when having the control cycle time of between 50 μs and 50 ms. The following techniques are proposed to prevent such noise.

A motor drive device of an electric power steering described in Japanese Patent No. 2540140 assumes one switching element of each pair for conduction holding and the other switching element for high-speed switching of the switching elements of two pairs, and has the frequency of a pulse width modulation signal for high-speed switching higher than an audible frequency region, and thus the linearity of the output torque of the motor with respect to a steering torque can be enhanced by effectively utilizing a current continuation effect by a flywheel diode, and the generation of vibration sound can be prevented regardless of the switching by the pulse width modulation signal.

An inverter device described in Japanese Unexamined Patent Publication No. 63-73898 generates the PWM signal by comparing a modulation wave signal obtained by amplifying an error of a magnetic flux command signal of the frequency proportional to the frequency command from the outside and a motor voltage integration signal outputted by an integration circuit for integrating an inverter output voltage, and a triangular signal which is the carrier frequency of the non-audible frequency.

A controller of an electric vehicle described in Japanese Unexamined Patent Publication No. 9-191508 drives a motor with the power of a battery by PWM controlling an inverter arranged between a battery and a motor with a PWM control section, and normally sets the frequency of the PWM control section higher than an audible frequency to reduce the switching noise of the inverter. When a motor operation state detection section detects that the motor is in a low-speed, high-load operation state, and there is a possibility the switching element of the inverter may overheat, a frequency changing section lowers the frequency of the PWM control section to prevent damage by overheat of the switching element of the inverter.

However, there is not yet proposed a controller of a multi-phase electric motor capable of generating the PWM signal based on the saw-tooth signal or the triangular signal, and detecting the current value of each phase at satisfactory precision for every control period using a signal current detection section, and having a sufficient noise prevention effect.

FIG. 8 shows a diagram showing a comparison example not dependent on the present invention, and is a timing chart in a case where two phases are not detectable. One control period is 250 μsec, and includes five periods of the PWM signal based on the saw-tooth signal of 50 μsec period. In the figure, an operation in the fourth and the fifth periods of the previous control period T1, and the first to the fifth periods of the present controller period T2 is shown. In the previous control period T1, a case where the PWM signal of A phase is duty 52%, the PWM signal of B phase is duty 47%, and PWM signal of C phase is duty 51% is shown. Since the time interval between the B phase, which is the duty minimum phase, and the C phase, which is the duty intermediate phase, and between the C phase, which is the duty intermediate phase, and the A phase, which is the duty maximum phase, is 4% and 1%, that is, short respectively, the switching noise of the relevant period cannot be accommodated unless the phase is shifted, and the A/D conversion time for accurately detecting the current value cannot be ensured. Thus, the phase of the PWM signal of the B phase which is the duty minimum phase is shifted to the left side (to advance phase) by 8%, and the phase of the PWM signal of the A phase which is the duty maximum phase is shifted to the right side (to delay phase) by 11%. Thus, both switching time intervals between the B phase and the C phase, and between the A phase and the C phase become 12%, that is, large, and the accurate current value of the A phase and the B phase can be detected in each PWM period.

An operation in the first to the fifth periods of the present control period T2 will now be described. In the present control period T2, the PWM signal of the A phase reduces from the duty 52% to 51%, the PWM signal of the B phase does not change at the duty 47%, and the PWM signal of the C phase increases from the duty 51% to 52%. Therefore, the duty maximum phase changes from the A phase to the C phase, and the duty intermediate phase changes from the C phase to the A phase. The duty minimum phase is again the B phase. Since the time intervals between the B phase, which is the duty minimum phase, and the A phase, which is the duty intermediate phase, and between the A phase, which is the duty intermediate phase, and the C phase, which is the duty maximum phase, are 4% and 1%, that is, short respectively, the switching noise of the relevant period cannot be accommodated unless the phase is shifted, and the A/D conversion time for accurately detecting the current value cannot be ensured. Thus, the phase is shifted to the left side (to advance phase) by 8% for the PWM signal of the B phase which is the duty minimum phase, the phase is shifted to the right side (to delay phase) by 11% for the PWM signal of the C phase which is the duty maximum phase, and the PWM signal of the A phase which is the duty intermediate phase is not shifted.

Thus, in each of the five PWM periods of the present control period T2, both switching time intervals of between the A phase and the B phase, and between the C phase and the A phase become 12%, that is, large and the accurate current value of the A phase and the B phase can be detected in each PWM period. With respect to the timing of performing the A/D conversion, in any period, the detection of the current value of the B phase is performed in a period necessary for the A/D conversion immediately before the fall of the PWM signal of the A phase which is the duty intermediate phase in an even number vector state (1, 0, 1), and the detection of the current value of the C phase is performed in a period necessary for the A/D conversion immediately before the fall of the PWM signal of the C phase which is the duty maximum phase in an odd number vector state (0, 0, 1). The vector will be hereinafter described in the section of the description of one or more embodiments of the present invention.

This example is a case where change is made from shift to no shift for the A phase, shift is made but the shift amount is not changed for the B phase, and change is made from no shift to shift for the C phase. Thus, when shift/no shift changes due to the change in the magnitude relation of the duty of each phase in the previous and the present control periods T1, T2, an instantaneous current fluctuation produces as shown in the shunt waveform (waveform of the voltage generated over both ends of a current detection shunt resistor) at an end time of the previous control period T1, that is, at a start time of the present control period T2. With the sudden current fluctuation, noise based on the current ripple generates from the motor. The shunt waveform shows the current of the A phase and the −B phase in the previous control period T1, and the current of the C phase and the −B phase in the present control period T2. The waveforms are different.

SUMMARY

As described above, noise generates by the influence of current ripple involved in a sudden current fluctuation as the shift state in each control period T1, T2 changes in some cases. The change in the shift state includes the following three.

(1) Change no shift→shift
(2) Change shift→no shift
(3) Shift (shift amount A)→shift (shift amount B), change in shift amount (i.e., A≠B)

One or more embodiments of the present invention provides a controller of a multi-phase electric motor capable of detecting the current value of each phase at satisfactory precision for every control period using a single current detection section, and preventing the generation of noise arising from the current ripple involved in the change in the PWM signal.

In accordance with one aspect of the present invention, a controller of a multi-phase electric motor according to one or more embodiments of the present invention includes a drive section, including a pair of an upper arm switching element and a lower arm switching element, for driving the multi-phase electric motor; a single current detection section for detecting a current value of the multi-phase electric motor; a PWM signal generation section for generating plural PWM signals of each phase within one control period based on the current value detected by the current detection section and a carrier signal; and a phase movement section for moving the PWM signal of a predetermined phase generated by the PWM signal generation section by gradually changing a movement amount of the phase in one control period, and outputting the PWM signal which phase is moved to the drive section.

Thus, the phase movement section moves the PWM signal of the predetermined phase by gradually changing the movement amount of the phase in one control period, and outputs the PWM signal which phase is moved to the drive section, and thus sudden change in current by the change in the PWM signal can be suppressed, and generation of noise based on the current ripple can be prevented. Furthermore, even if the time interval of switching between the predetermined phase and another phase is originally short to an extent the current value cannot be detected, the time interval of the switching between the predetermined phase in which the phase is moved and the another phase becomes large, and the current value can be detected with the current value of the moved predetermined phase stabilized, whereby the current value of each phase can be accurately detected for every control period using the single current detection section without changing the duty of each phase.

According to one or more embodiments of the present invention, in the controller of the multi-phase electric motor, the phase movement section may gradually change the movement amount of the phase of the predetermined phase in the control period from a movement amount immediately before to have the movement amount of the phase of the predetermined phase in a last period of the control period as the movement amount of the phase of the predetermined phase in the control period when the movement amount of the phase of the predetermined phase in the control period immediately before and the movement amount of the phase of the predetermined phase in the control period are different.

Thus, when the movement amount of the phase of the predetermined phase in the control period immediately before and the movement amount of the phase of the predetermined phase in the relevant control period are different, the movement amount of the phase in one control period is gradually changed from the movement amount immediately before, and thus the sudden change in current by the change of the PWM signal is suppressed, and generation of noise based on the current ripple can be prevented.

According to one or more embodiments of the present invention, the controller of the multi-phase electric motor further includes a current detectability determination section for determining whether or not the current value is detectable in the current detection section based on the PWM signal of each phase generated by the PWM signal generation section; wherein the phase movement section may move the phase of the PWM signal of the predetermined phase generated by the PWM signal generation section when the current detectability determination section determines that the current is not detectable. In addition, the controller of the multi-phase electric motor further includes a switching number determination section for determining whether or not number of the upper arm switching element to turn ON is an even number or an odd number when the current detectability determination section determines that the current is not detectable; wherein the phase movement section may move the phase of the PWM signal of the predetermined phase generated by the PWM signal generation section based on the determination result of the switching number determination section.

Thus, even if the time interval of switching between the predetermined phase and another phase is originally short to an extent the current value cannot be detected, the time interval of the switching between the predetermined phase in which the phase is moved and the another phase becomes large, and the current value can be detected with the current value of the moved predetermined phase stabilized, whereby the current value of each phase can be accurately detected for every control period using the single current detection section without changing the duty of each phase.

According to one or more embodiments of the present invention, the controller of the multi-phase electric motor may includes a current detection period determination section for determining a current detection period of the current detection section based on a time the PWM signal of each phase changes in the last period of the control period.

Thus, the time interval of the switching between the predetermined phase and another phase is the largest in the last period of the control period, and the current value can be detected in a state that the current value is stabilized without barely any influence of the switching noise immediately before the time in which the PWM signal of the predetermined phase is changed, whereby the current value of each phase can be accurately detected for every control period using the single current detection section without changing the duty of each phase.

According to the controller of the multi-phase electric motor according to one or more embodiments of the present invention, the phase movement section moves the PWM signal of the predetermined phase by gradually changing the movement amount of the phase in one control period, and outputs the PWM signal which phase is moved to the drive section, and thus sudden change in current by the change of the PWM signal can be suppressed, and generation of noise based on the current ripple can be prevented. Furthermore, even if the time interval of the switching between the predetermined phase and another phase is originally short to an extent the current value cannot be detected, the time interval of the switching between the predetermined phase in which the phase is moved and the another phase becomes large, and thus the current value can be detected with the current value of the moved predetermined phase stabilized, whereby the current value of each phase can be accurately detected for every control period using the single current detection section without changing the duty of each phase.

DETAILED DESCRIPTION

Embodiments of the present invention will be described below with reference to the drawings.

Figure 1:
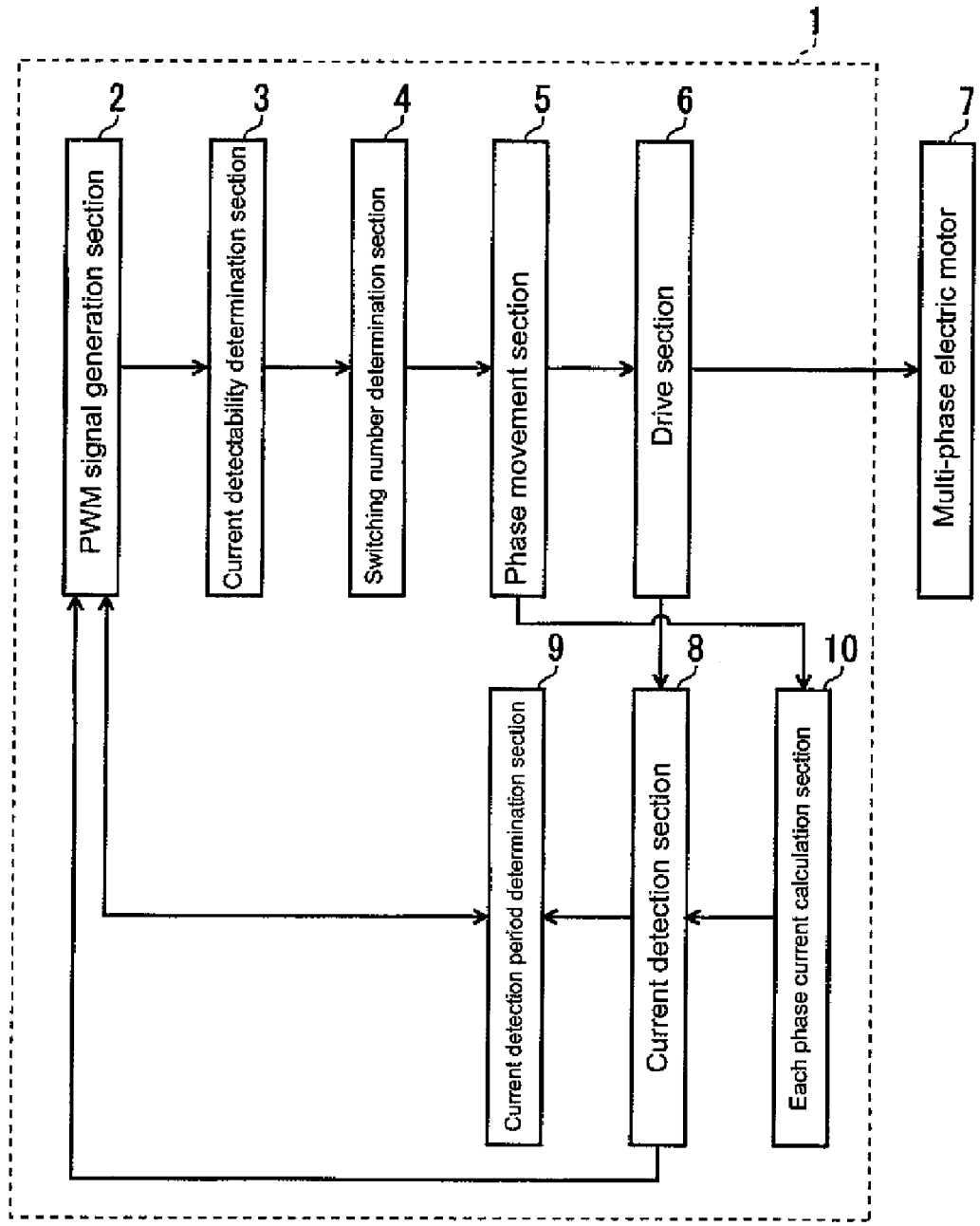
FIG. 1 shows a block diagram of a controller of a multi-phase electric motor according to one or more embodiments of the present invention.

FIG. 1 shows a block diagram of a controller of a multi-phase electric motor according to one or more embodiments of the present invention. A controller 1 of a multi-phase electric motor 7 according to one or more embodiments of the present invention has the following configuration. A drive section 6 is connected between a power supply and a ground, as hereinafter described in the description of a circuit diagram of FIG. 2, includes a pair of upper arm switching elements and lower arm switching elements, and drives the multi-phase electric motor 7. A current detection section 8 is connected between the drive section 6 and a ground, and detects a current value flowing to the multi-phase electric motor 7 at a predetermined time. A PWM signal generation section 2 generates PWM signal of each phase based on the current value detected in the current detection section 8 and the saw-tooth signal having a predetermined frequency.

A current detectability determination section 3 determines whether or not the current value is detectable in the current detection section 8, that is, whether or not there is a switching time interval for an accurate current value to be detected in the current detection section 8 based on the PWM signal of each phase generated in the PWM signal generation section 2. A switching number determination section 4 determines whether the number of switching elements turned ON of the three upper arm switching elements is an even number when the current detectability determination section 3 determines that the current is not detectable. A phase movement section 5, based on the determination result of the switching number determination section 4, advances or delays the phase of the PWM signal of the predetermined phase generated by the PWM signal generation section 2 by gradually changing the movement amount in one control period, and outputs the PWM signal which phase is moved to the drive section 6. A current detection period determination section 10 determines a current detection start timing and a current detection period by the current detection section 8 based on a fall time of the PWM signal of each phase determined in the phase movement section 5. Each phase current calculation section 9 calculates the current value of the remaining phase that cannot be directly detected based on the current value detected in the current detection section 8 and the PWM signal generated in the PWM signal generation section 2.

Figure 2:
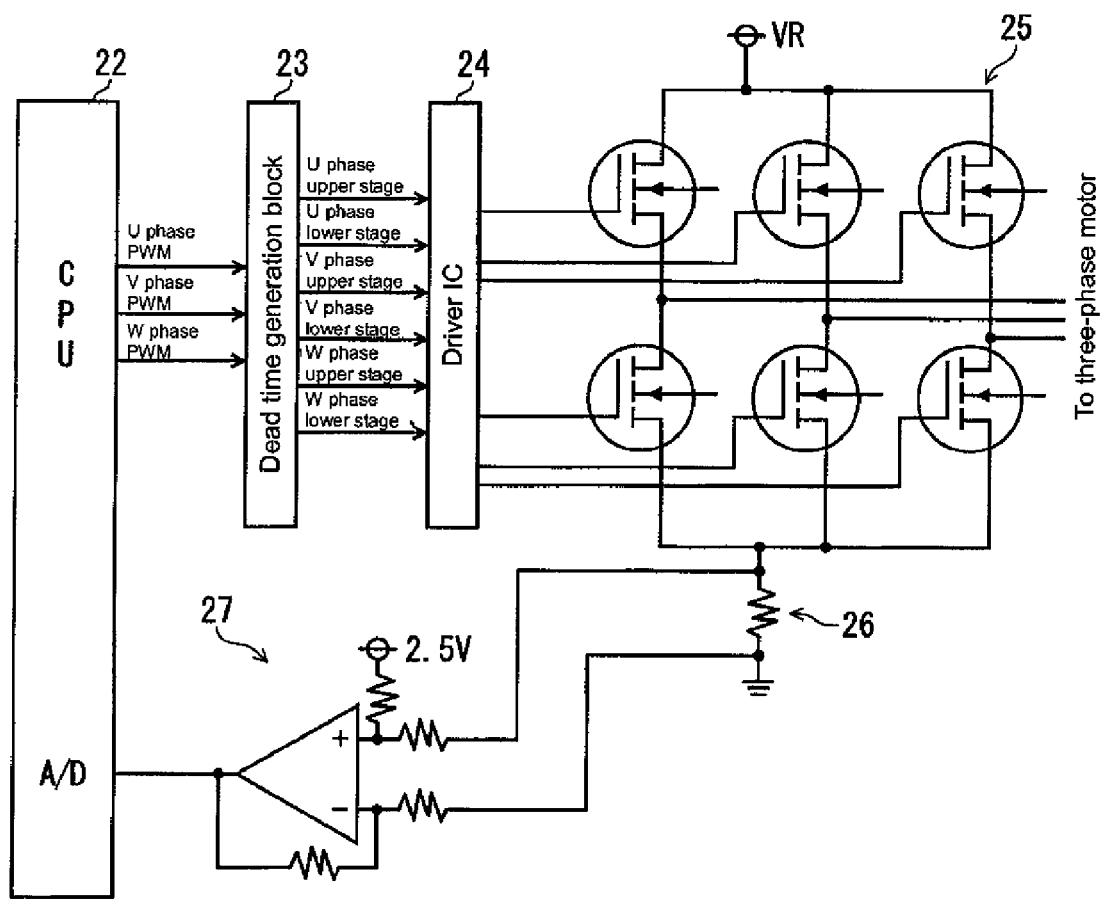
FIG. 2 shows a circuit diagram of the controller of the multi-phase electric motor according to one or more embodiments of the present invention.

FIG. 2 shows a circuit diagram of the controller 1 of the multi-phase electric motor according to one or more embodiments of the present invention. A CPU 22 outputs each PWM signal of the U phase upper stage, the V phase upper stage, and the W phase upper stage to a dead time generation block 23. The dead time generation block 23 inputs such signals, provides a slight time interval in which the signals for the upper arm switching elements and the lower arm switching elements of each phase are turned OFF such that the signals for the upper arm switching elements and the lower arm switching elements of each phase both are not turned ON for circuit protection, generates each PWM signal of the U phase upper stage, the U phase lower stage, the V phase upper stage, the V phase lower stage, the W phase upper stage, and the W phase lower stage and outputs the PWM signals to a driver IC 24. The function of the dead time generation block 23 may be realized by software in the CPU 22.

The driver IC 24 inputs such signals to control an FET bridge 25. The FET bridge 25 is connected between a power supply VR and the ground, and includes three pairs of the upper arm switching elements and the lower arm switching elements. An intermediate part of the three pairs of the upper arm switching elements and the lower arm switching elements is connected to each phase of the three-phase electric motor. A single shunt resistor 26 is connected between the FET bridge 25 and the ground. The voltage over both ends of the shunt resistor 26 is input to an A/D conversion port of the CPU 22 via a current detection circuit 27 including an operational amplifier, a resistor, and the like.

The basic function of the present circuit is as described below. The phase current detection period is 250 μsec, the detection method is two-phase detection/one-phase estimation method, and the PWM mode is a saw-tooth PWM.

In the configuration of FIG. 2, the CPU 22 configures the current detectability determination section 3, the switching number determination section 4, the phase movement section 5, each phase current calculation section 9, and the current detection period determination section 10 in FIG. 1, the CPU 22 and the dead time generation block 23 configure the PWM signal generation section 2 in FIG. 1, the FET bridge 25 configures the drive section 6 in FIG. 1, and the shunt resistor 26 and the current detection circuit 27 configure the current detection section 8 in FIG. 1. In the present embodiment, the three-phase electric motor is used for the multi-phase electric motor 7 of FIG. 1. The three-phase electric motor is a brushless motor used in an electrical power steering device of the vehicle, and the like.

Figure 3:
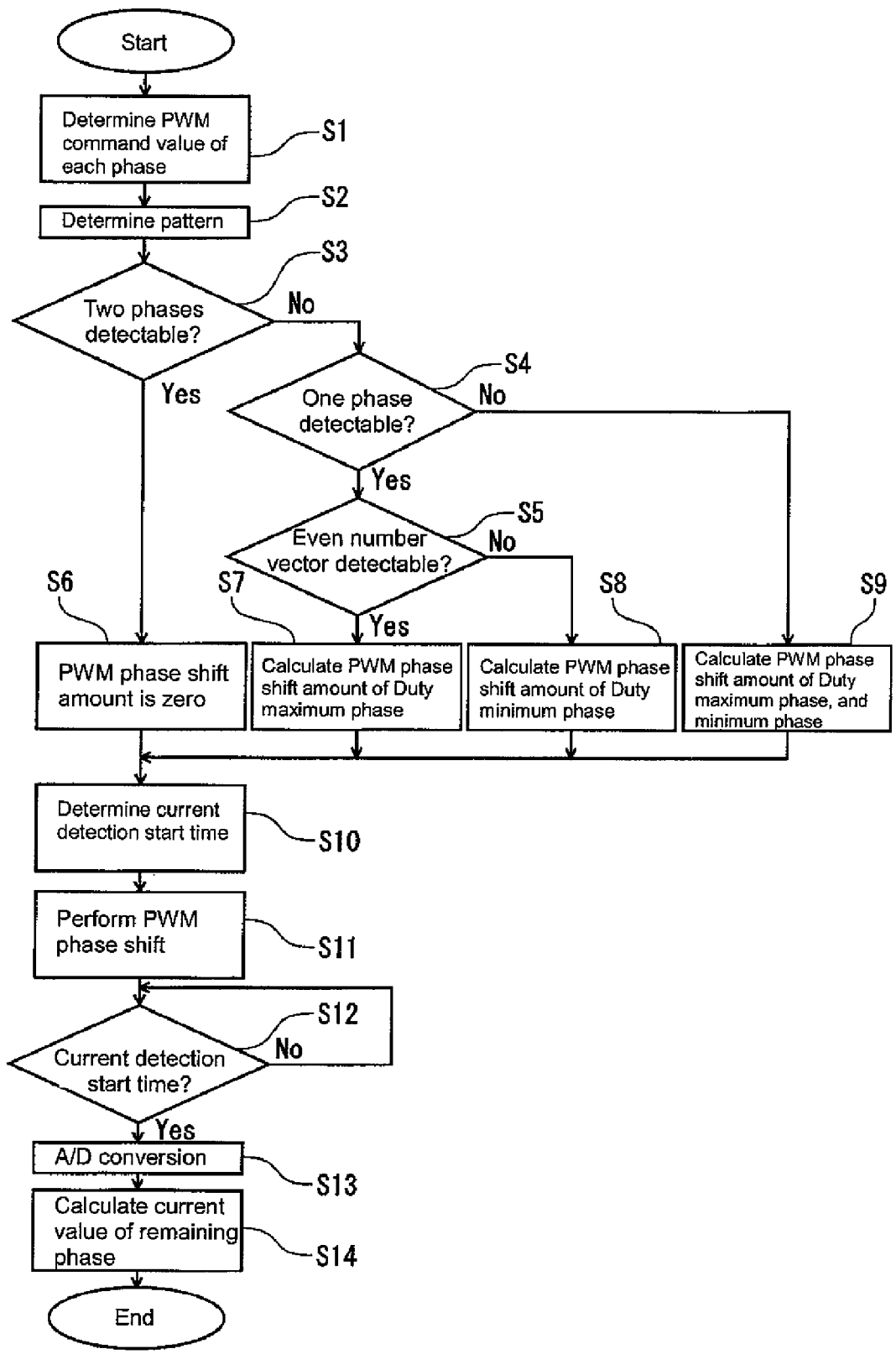
FIG. 3 shows a flowchart of the controller of the multi-phase electric motor according to one or more embodiments of the present invention.

FIG. 3 shows a flowchart of the controller 1 of the multi-phase electric motor according to one or more embodiments of the present invention. First, the PWM signal generation section 2 determines a PWM command value of each phase of U, V, and W (S1). As the details will be hereinafter described, pattern determination is performed based on the duty of each phase of U, V, and W (S2). The separation of cases of detectability by the current detectability determination section 3 is then carried out (S3 to S5). First, whether or not two phases of the three phases are detectable is determined (S3). If two phases are not detectable (No in S3), whether or not one phase of the three phases is detectable is determined (S4). If one phase is detectable (Yes in S4), the switching number determination section 4 determines whether an even number vector is detectable (S5). If the even number vector is not detectable (No in S5), an odd number vector is detectable. The even number vector and the odd number vector will be hereinafter described.

The phase movement section 5 then calculates the phase that requires movement and the necessary amount of shift based on the detectability determination condition. First, if two phases are detectable (Yes in S3), the movement is not necessary, and the phase shift amount of each phase of PWM may be zero (S6). If only the even number vector is detectable (Yes in S5), the phase of the phase having a maximum duty is delayed, and the shift amount thereof is calculated (S7). If only the odd number vector is detectable (No in S5), the phase of the phase having a minimum duty is advanced, and the shift amount thereof is calculated (S8). If no phase is detectable (No in S4), the phase of the phase having a maximum duty and the phase of the phase having a minimum duty are both shifted, and the respective shift amount are calculated (S9). The current detection period determination section 10 determines the current detection start timing by the current detection section 8 based on the fall time of the PWM signal of each phase determined by the phase movement section 5 (S10). The current detection start timing will be hereinafter described in detail.

The phase movement section 5 performs the PWM phase shift of each phase by the calculated shift amount (S11). The calculation of the shift amount in each of the five periods in one control period will be specifically described in FIG. 4. In the case of no PWM phase shift (S6), the phase shift amount is zero. When a current detection start timing of two locations, to be hereinafter described, is reached (Yes in S12), the current detection section 8 starts the A/D conversion (S13). The switching of each phase is not carried out during the A/D conversion period, and the PWM signal of a predetermined phase falls at the time point where the time necessary for the A/D conversion has elapsed. After the current detection section 8 detects the current of two phases in such a manner, the each phase current calculation section 9 calculates the current value of the remaining one phase that is not detected based on the Kirchhoff's Law (total of three currents flowing to the three-phase electric motor is zero. In other words, Iu+Iv+Iw=0 where Iu: U phase current, Iv: V phase current, Iw: W phase current) (S14).

Figure 4:
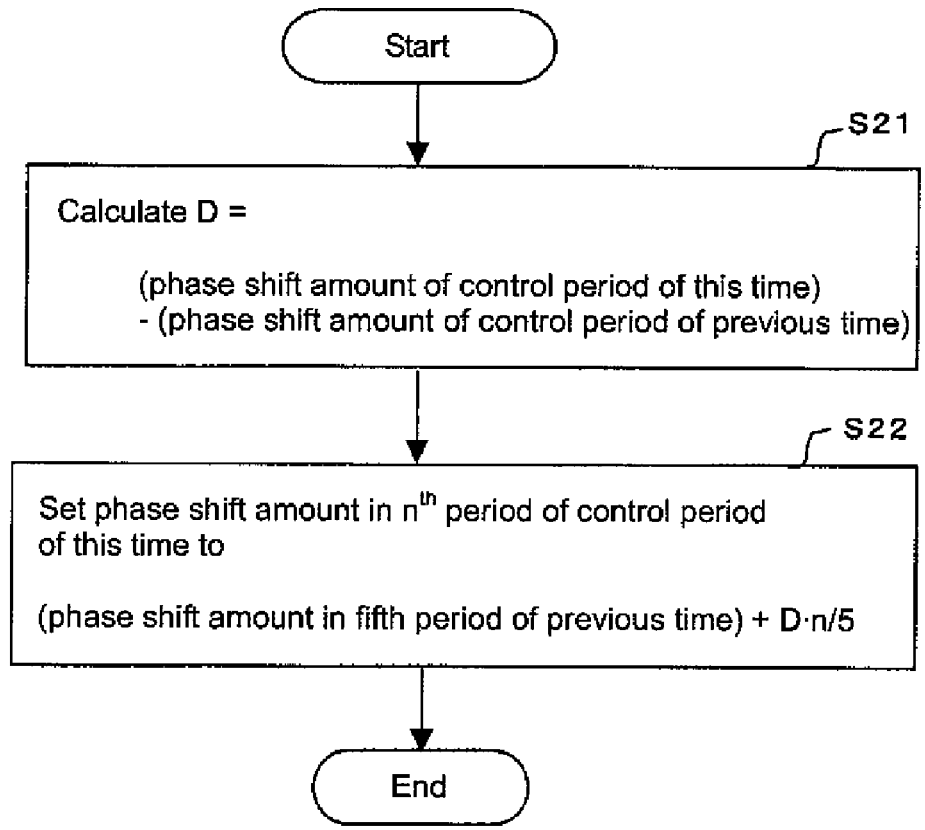
FIG. 4 shows a flowchart on the calculation of a shift amount in five periods of a control period.

FIG. 4 shows a flowchart on the calculation of the shift amount in each of the five periods of the control period of the controller 1 of the multi-phase electric motor according to one or more embodiments of the present invention. In the present control, the control period is 250 μsec, and includes five periods of the PWM signal based on the saw-tooth signal of the 50 μsec period. First, a difference D between the phase shift amount of the control period of this time and the phase shift amount of the control period of the previous time is calculated for each phase (S21). The shift amount in the $n^{th}$ period of the control period of this time is set to (phase shift amount in fifth period of previous time)+D·n/5 (S22) for each phase. That is, the phase shift amount in the first period is set to (phase shift amount in fifth period of previous time)+D/5, the phase shift amount in the second period is set to (phase shift amount in fifth period of previous time)+D·2/5, the phase shift amount in the third period is set to (phase shift amount in fifth period of previous time)+D·3/5, the phase shift amount in the fourth period is set to (phase shift amount in fifth period of previous time)+D·4/5, and the phase shift amount in the last fifth period is set to (phase shift amount in fifth period of previous time)+D.

In particular, if the movement amount of the phase of the predetermined phase in the control period immediately before and the movement amount of the phase of the predetermined phase in the control period of this time are the same, D=0 is obtained, and the phase shift amount in all the periods of the control period of this time becomes the same as the phase shift amount in the fifth period of the previous time. That is, there is no change in the state of shift in the control period immediately before and the control period of this time.

If the movement amount of the phase of the predetermined phase in the control period immediately before is zero, and the movement amount of the phase of the predetermined phase in the control period of this time is not zero, the phase shift amount in the $n^{th}$ period of the control period of this time becomes D·n/5. In other words, the shift amount is gradually increased from zero in the control period of this time.

If the movement amount of the phase of the predetermined phase in the control period immediately before is not zero, and the movement amount of the phase of the predetermined phase in the control period of this time is zero, D=−(phase shift amount in the fifth period of the previous time), and thus the phase shift amount in the $n^{th}$ period of the control period of this time becomes, (phase shift amount in the fifth period of the previous time)+D·n/5=(phase shift amount in the fifth period of the previous time)·(1−n/5).

In other words, the shift amount is gradually decreased in the control period of this time, and the shift amount becomes zero at the last period.

Table 1 is a table showing PWM pattern determination condition, detectable vector, detected current, and AD conversion timing. Here, w_pwmU, w_pwmV, and w_pwmW respectively show the duty ratio of the command value of the U phase, the V phase, and the W phase. These are categorized into six patterns depending on the magnitude relation of the duty ratios of the three phases. For example, in a case of w_pwmU≧w_pwmW≧w_pwmV, the pattern is pattern 3 of table 1. In each pattern, the following four cases are considered. In other words, (1) when two phases are detectable
(2) when only odd number vector is detectable
(3) when only even number vector is detectable
(4) when both two phases are not detectable

TABLE 1

| Pattern | Pattern determination | Detectable vector | Detected current | AD conversion start time |
|---|---|---|---|---|
| 1 | w_pwmV >= w_pwmU >= w_pwmW | (0, 1, 0) Odd | V | V phase upper stage OFF |
| | | (1, 1, 0) Even | −W | U phase upper stage |

TABLE 1-continued

| Pattern | Pattern determination | Detectable vector | Detected current | AD conversion start time |
|---|---|---|---|---|
| 2 | w_pwmU >= w_pwmV >= w_pwmW | (1, 0, 0) Odd | U | U phase upper stage OFF |
|   |   | (1, 1, 0) Even | −W | V phase upper stage OFF |
| 3 | w_pwmU >= w_pwmW >= w_pwmV | (1, 0, 0) Odd | U | U phase upper stage OFF |
|   |   | (1, 0, 1) Even | −V | W phase upper stage OFF |
| 4 | w_pwmW >= w_pwmU >= w_pwmV | (0, 0, 1) Odd | W | W phase upper stage OFF |
|   |   | (1, 0, 1) Even | −V | U phase upper stage OFF |
| 5 | w_pwmW >= w_pwmV >= w_pwmU | (0, 0, 1) Odd | W | W phase upper stage OFF |
|   |   | (0, 1, 1) Even | −U | V phase upper stage OFF |
| 6 | w_pwmV >= w_pwmW >= w_pwmU | (0, 1, 0) Odd | V | V phase upper stage OFF |
|   |   | (0, 1, 1) Even | −U | W phase upper stage OFF |

For example, a case of detecting the odd number vector in pattern 3 is a case of detecting the U phase of the three phases, and the detectable vector is (1, 0, 0). This vector represents a state in which the U phase of the upper arm switching elements is ON in a first element (1), the V phase is OFF in a second element (0), and the W phase is OFF in a third element (0), where the number of switching element that is turned ON (1) of the three elements is only one, and thus is an odd number vector. The detectability determination condition in this case is (w_pwmU)−(w_pwmW)≧12% when the minimum time necessary for performing the A/D conversion within a period the current value is stable is 12% of the 50 μsec period, and the detectable timing sets the timing of turning OFF the U phase upper stage as the reference. That is, in view of the time necessary for A/D conversion, the end time of the A/D conversion matches the timing of turning OFF the U phase upper stage by starting the A/D conversion at the timing of the time necessary for A/D conversion before the timing of turning OFF the U phase upper stage, and thus this is the optimum timing at which the current value stabilizes.

A case of detecting the even number vector in pattern 3 is a case of detecting the −V phase, and the detectable vector is (1, 0, 1). This vector represents a state in which the U phase of the upper arm switching elements is ON in a first element (1), the V phase is OFF in a second element (0), and the W phase is ON in a third element (1), where the number of switching element that is turned ON (1) of the three elements is two, and thus is an even number vector. The detectability determination condition in this case is (w_pwmW)−(w_pwmV)≧12%, and the detectable timing sets the timing of turning OFF the W phase upper stage as the reference. That is, in view of the time necessary for AD conversion, the end time of the A/D conversion matches the timing of turning OFF the W phase upper stage by starting the A/D conversion at the timing of the time necessary for A/D conversion before the timing of turning OFF the W phase upper stage which is the duty intermediate phase, and thus this is the optimum timing at which the current value stabilizes. Similar concept can be applied to other patterns, and thus the description other than pattern 3 will not be given.

If sufficient detection time (e.g., MIN_DUTY=12%) of the current value by the A/D converter cannot be ensured, and an accurate current value cannot be detected since the current value is not stable, the phase is shifted in the following manner for each PWM input signal of the driver IC during the control period (50 μsec×5 periods). When two phases are detectable, the PWM phase shift is not necessary.

Table 2 is a table showing a case where only the even number vector is detectable. If only the even number vector is detectable, the shift is performed as in table 2 to ensure a detectable time in which the current value stabilizes for the two phases. That is, only the Duty maximum phase is shifted to the right side (side for delaying the phase) by the shift amount of MIN_DUTY (12%)−(maximum phase Duty %−intermediate phase Duty %). The shift is not made for the Duty intermediate phase and the Duty minimum phase.

TABLE 2

| Phase | Shift amount | Direction |
|---|---|---|
| Duty maximum phase | MIN_DUTY (12%) − (maximum phase Duty % − intermediate phase Duty %)) | Right side |
| Duty intermediate phase | No shift | |
| Duty minimum phase | No shift | |

Table 3 is a table showing a case where only the odd number vector is detectable. If only the odd number vector is detectable, the shift is performed as in table 3 to ensure a detectable time in which the current value stabilizes for the two phases. That is, only the Duty minimum phase is shifted to the left side (side for advancing the phase) by the shift amount of MIN_DUTY (12%)–(intermediate phase Duty %–minimum phase Duty %). The shift is not made for the Duty maximum phase and the Duty intermediate phase.

TABLE 3

| Phase | Shift amount | Direction |
|---|---|---|
| Duty maximum phase | No shift | |
| Duty intermediate phase | No shift | |
| Duty minimum phase | MIN_DUTY (12%) – (intermediate phase Duty % – minimum phase Duty %)) | Left side |

Table 4 is a table showing a case where two phases are both not detectable. If two phases are both not detectable, the shift is performed as in table 4 to ensure a detectable time in which the current value stabilizes for the two phases. That is, the Duty maximum phase is shifted to the right side (side for delaying the phase) by the shift amount of MIN_DUTY (12%)–(maximum phase Duty %–intermediate phase Duty %). Furthermore, the Duty minimum phase is shifted to the left side (side for advancing the phase) by the shift amount of MIN_DUTY (12%)–(intermediate phase Duty %–minimum phase Duty %). The shift is not made for the Duty intermediate phase.

TABLE 4

| Phase | Shift amount | Direction |
|---|---|---|
| Duty maximum phase | MIN_DUTY (12%) – (maximum phase Duty % – intermediate phase Duty %) | Right side |
| Duty intermediate phase | No shift | |
| Duty minimum phase | MIN_DUTY (12%) – (intermediate phase Duty % – minimum phase Duty %) | Left side |

Figure 5:
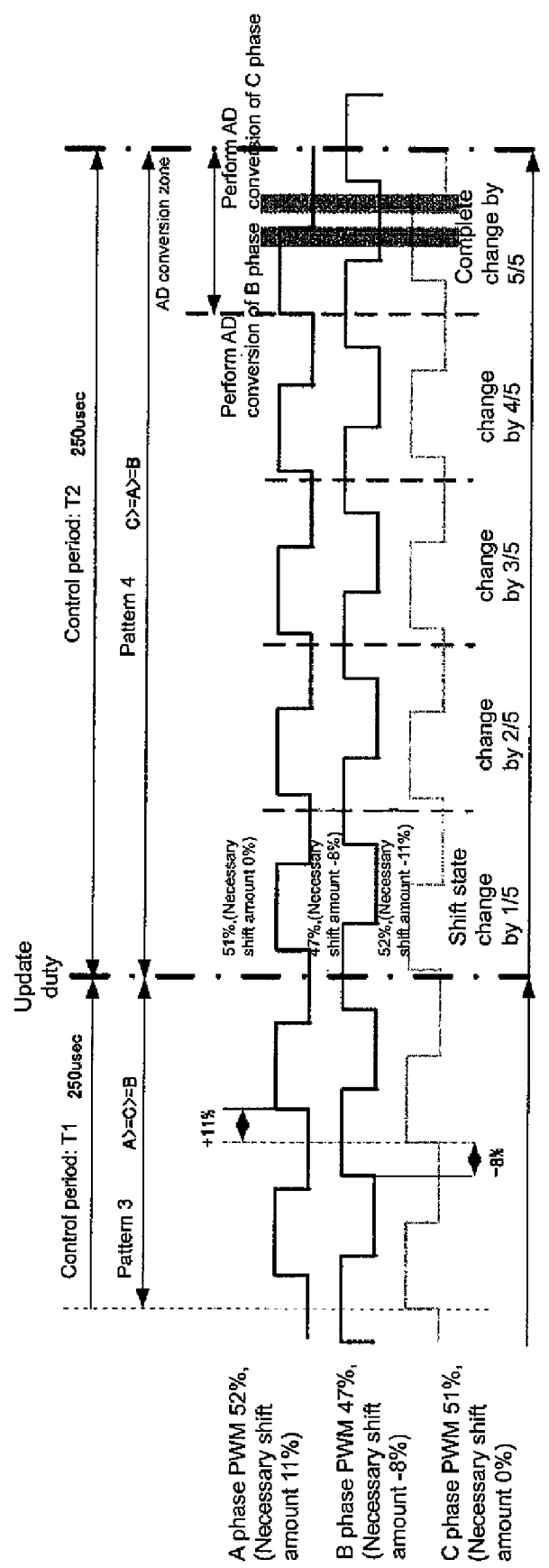
FIG. 5 shows a timing chart in cases where two phases are detectable and a pattern is changed.

FIG. 5 shows a timing chart in cases where two phases are both not detectable, and the pattern is changed. One control period is 250 μsec, and includes five periods of the PWM signal based on the saw-tooth signal of 50 μsec period. In the figure, an operation in the fourth and the fifth periods of the control period T1 of the previous time, and the first to the fifth periods of the control period T2 of this time is shown. In the control period T1 of the previous time, a case where the PWM signal of A phase is duty 52%, the PWM signal of B phase is duty 47%, and the PWM signal of C phase is duty 51% is shown. This state corresponds to pattern 3 in table 1. Since the time intervals between the B phase, which is the duty minimum phase, and the C phase, which is the duty intermediate phase, and between the C phase, which is the duty intermediate phase, and the A phase, which is the duty maximum phase, are 4% and 1%, that is, short respectively, the switching noise of the relevant period is not accommodated unless the phase is shifted, and the A/D conversion time for accurately detecting the current value cannot be taken. Thus, the phase needs to be shifted to the left side (to advance the phase) by 8% for the PWM signal of the B phase which is minimum phase, and the phase needs to be shifted to the right side (to delay the phase) by 11% for the PWM signal of the A phase which is the maximum phase. The switching time intervals between the B phase and the C phase, and between the A phase and the C phase thus both become 12%, that is, large, and the accurate current value of the A phase and the B phase can be detected in the last fifth PWM period of the control period T1.

An operation in the first to the fifth periods of the control period T2 of this time will now be described. In the control period T2 of this time, the PWM signal of the A phase reduces from duty 52% to 51%, the PWM signal of the B phase does not change at duty 47%, and the PWM signal of the C phase increases from duty 51% to duty 52%. Therefore, the duty maximum phase changes from the A phase to the C phase, and the duty intermediate phase changes from the C phase to the A phase. The duty minimum phase is again the B phase. This state corresponds to pattern 4 in the table 1. Since the time intervals between the B phase, which is the duty minimum phase, and the A phase, which is the duty intermediate phase, and between the A phase, which is the duty intermediate phase, and the C phase, which is the duty maximum phase, are 4% and 1%, that is, short respectively, the switching noise of the relevant period cannot be accommodated, and the A/D conversion time for accurately detecting the current value cannot be ensured. Thus, the phase is shifted to the left side (to advance phase) by 8% for the PWM signal of the B phase which is the duty minimum phase, the phase is shifted to the right side (to delay phase) by 11% for the PWM signal of the C phase which is the duty maximum phase, and the PWM signal of the A phase which is the duty intermediate phase is not shifted. The difference D in the phase shift amount of the control period T2 of this time and the phase shift amount of the control period T1 of the previous time is −11% for the A phase, 0% for the B phase, and 11% for the C phase.

The phase shift amount in the $n^{th}$ period of the control period T2 of this time is calculated using the equation (phase shift amount in the fifth period of previous time)+D·n/5 for each phase. That is, the phase shift amount in the first period in the A phase is 11%−11%/5=11%×4/5; the phase shift amount in the second period is 11%−11%×2/5=11%×3/5; the phase shift amount in the third period is 11%−11%×3/5=11%×2/5; the phase shift amount in the fourth period is 11%−11%×4/5=11%×1/5; and the phase shift amount in the last fifth period is 11%−11%=0%.

The phase shift amount in the first period for the B phase is −8%+0%/5=−8%; the phase shift amount in the second period is −8%+0%×2/5=−8%; the phase shift amount in the third period is −8%+0%×3/5=−8%; the phase shift amount in the fourth period is −8%+0%×4/5=−8%; and the phase shift amount in the last fifth period is −8%+0%×5/5=−8%. That is, the shift amount does not change in any period.

The phase shift amount in the first period for the C phase is 0%+11%/5=11%; the phase shift amount in the second period is 0%+11%×2/5=11%×2/5; the phase shift amount in the third period is 0%+11%×3/5=11%×3/5; the phase shift amount in the fourth period is 0%+11%×4/5=11%×4/5; and the phase shift amount in the last fifth period is 0%+11%×5/5=11%.

Thus, in the last fifth period, the switching time intervals between the A phase and the B phase, and between the C phase and the A phase both become 12%, that is, large and the accurate current value of the A phase and the B phase can be detected in the last fifth PWM period. With respect to the timing of performing the A/D conversion, the detection of the current value of the B phase is performed in the period necessary for A/D conversion immediately before the fall of the PWM signal of the A phase which is the intermediate phase in the even number vector state (1, 0, 1) in the fifth PWM period (shaded portion on the left side), and the detection of the current value of the C phase is performed in the period necessary for A/D conversion immediately before the fall of the PWM signal of the C phase which is the maximum phase in the odd number vector state (0, 0, 1) (shaded portion on the right side).

This example is a case where change is made from shift to no shift and the shift amount is reduced for the A phase, shift is still made but the shift amount is not changed for the B phase, and change is made from no shift to shift and the shift amount is increased for the C phase.

As shown in FIG. 5, the shift of the PWM signal of each phase is performed in all five periods of each control period, and the movement amount of the phase is gradually changed, whereby sudden current change does not occur in shifting the PWM signal, and generation of noise can be prevented.

Figure 6:
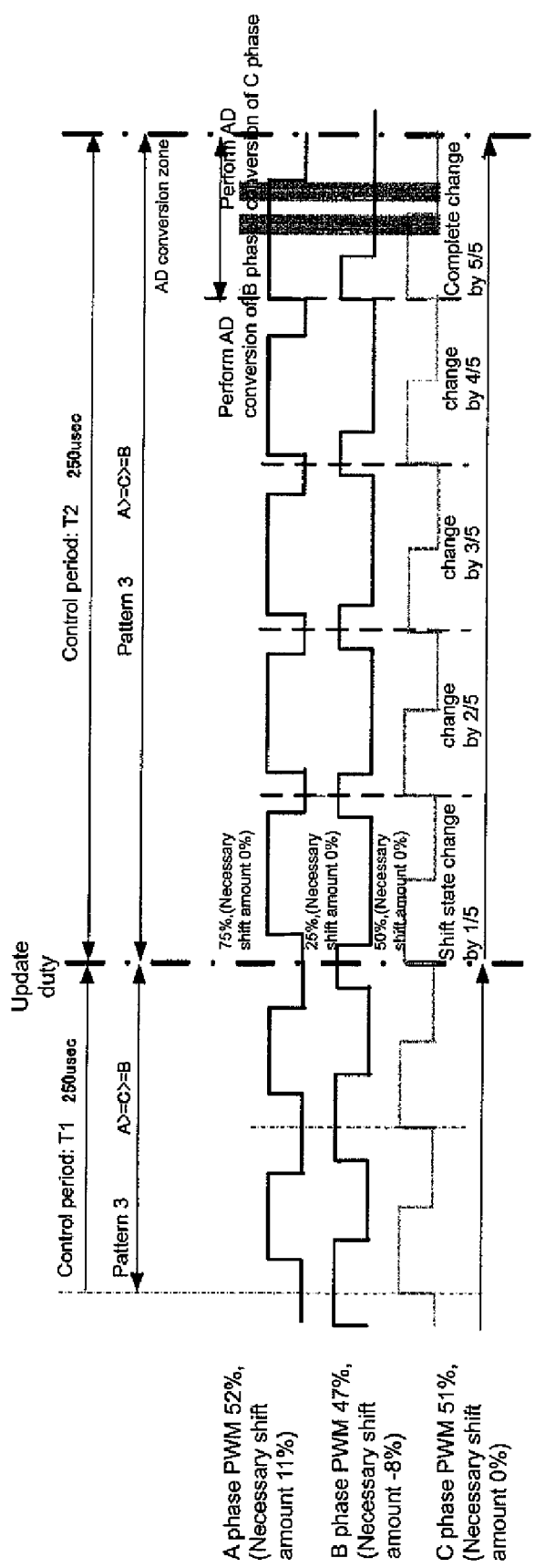
FIG. 6 shows a timing chart in cases where the pattern does not change, and only the shift amount is changed.

FIG. 6 shows a timing chart in cases where the pattern is not changed and only the shift amount is changed. This is a case where transition is made from the state in which two phases are both not detectable by the change of duty to the state in which two phases are both detectable. In the figure, the operation in the fourth and the fifth periods of the control period T1 of the previous time and the first to the fifth periods of the control period T2 of this time is shown. In the control period T1 of the previous time, a case where the PWM signal of A phase is duty 52%, the PWM signal of B phase is duty 47%, and the PWM signal of C phase is duty 51% is shown. This state corresponds to pattern 3 in table 1. Since the time intervals between the B phase, which is the duty minimum phase, and the C phase, which is the duty intermediate phase, and between the C phase, which is the duty intermediate phase, and the A phase, which is the duty maximum phase, are 4% and 1%, that is, short respectively, the switching noise of the relevant period is not accommodated unless the phase is shifted, and the A/D conversion time for accurately detecting the current value cannot be taken. Thus, the phase needs to be shifted to the left side (to advance the phase) by 8% for the PWM signal of the B phase which is minimum phase, and the phase needs to be shifted to the right side (to delay the phase) by 11% for the PWM signal of the A phase which is the maximum phase. The switching time intervals between the B phase and the C phase, and between the A phase and the C phase thus both become 12%, that is, large and the accurate current value of the A phase and the B phase can be detected in the last fifth PWM period of the control period T1.

An operation in the first to the fifth periods of the control period T2 of this time will now be described. In the control period T2 of this time, the PWM signal of the A phase increases from duty 52% to 75%, the PWM signal of the B phase reduces from duty 47% to 25%, and the PWM signal of the C phase reduces from duty 51% to 50%. Therefore, the duty maximum phase is the A phase, the duty intermediate phase is the C phase, and the duty minimum phase is B phase in which there is no change. Therefore, this state corresponds to pattern 3 in the table 1. Since the time intervals between the B phase, which is the duty minimum phase, and the C phase, which is the duty intermediate phase, and between the C phase, which is the duty intermediate phase, and the A phase, which is the duty maximum phase, are both 25%, that is, sufficiently long, the switching noise of the relevant period is accommodated, and the A/D conversion time for accurately detecting the current value is ensured. Thus, the PWM signal of each phase is not shifted. The difference D in the phase shift amount of the control period T2 of this time and the phase shift amount of the control period T1 of the previous time is −11% for the A phase, 8% for the B phase, and 0% for the C phase.

The phase shift amount in the $n^{th}$ period of the control period T2 of this time is calculated using the equation (phase shift amount in the fifth period of previous time)+D·n/5 for each phase. That is, the phase shift amount in the first period in the A phase is 11%−11%/5=11%×4/5; the phase shift amount in the second period is 11%−11%×2/5=11%×3/5; the phase shift amount in the third period is 11%−11%×3/5=11%×2/5; the phase shift amount in the fourth period is 11%−11%×4/5=11%×1/5; and the phase shift amount in the last fifth period is 11%−11%=0%.

The phase shift amount in the first period for the B phase is −8%+8%//5=−8%×4/5; the phase shift amount in the second period is −8%+8%×2/5=−8%×3/5; the phase shift amount in the third period is −8%+8%×3/5=−8%×2/5; the phase shift amount in the fourth period is −8%+8%×4/5=−8%×1/5; and the phase shift amount in the last fifth period is −8%+8%×5/5=0%.

The phase shift amount in the first period for the C phase is 0%+0%/5=0%; the phase shift amount in the second period is 0%+0%×2/5=0%; the phase shift amount in the third period is 0%+0%×3/5=0%; the phase shift amount in the fourth period is 0%+0%×4/5=0%; and the phase shift amount in the last fifth period is 0%+0%×5/5=0%. That is, the shift is not made in any period.

Thus, in the last fifth period, the switching time intervals between the A phase and the C phase, and between the C phase and the B phase both become 25%, that is, large and the accurate current value of the A phase and the B phase can be detected in the last fifth PWM period. With respect to the timing of performing the A/D conversion, the detection of the current value of the B phase is performed in the period necessary for A/D conversion immediately before the fall of the PWM signal of the C phase which is the intermediate phase in the even number vector state (1, 0, 1) in the fifth PWM period (shaded portion on the left side), and the detection of the current value of the A phase is performed in the period necessary for A/D conversion immediately before the fall of the PWM signal of the A phase which is the maximum phase in the odd number vector state (1, 0, 0) (shaded portion on the right side).

This example is a case where change is made from shift to no shift and the shift amount is reduced for the A phase, change is made from shift to no shift and the shift amount is increased for the B phase, and shift is not made and change is not made for the C phase.

As shown in FIG. 6, the shift of the PWM signal of each phase is performed in all five periods of each control period, and the movement amount of the phase is gradually changed, whereby sudden current change does not occur in shifting the PWM signal, and generation of noise can be prevented.

Figure 7:
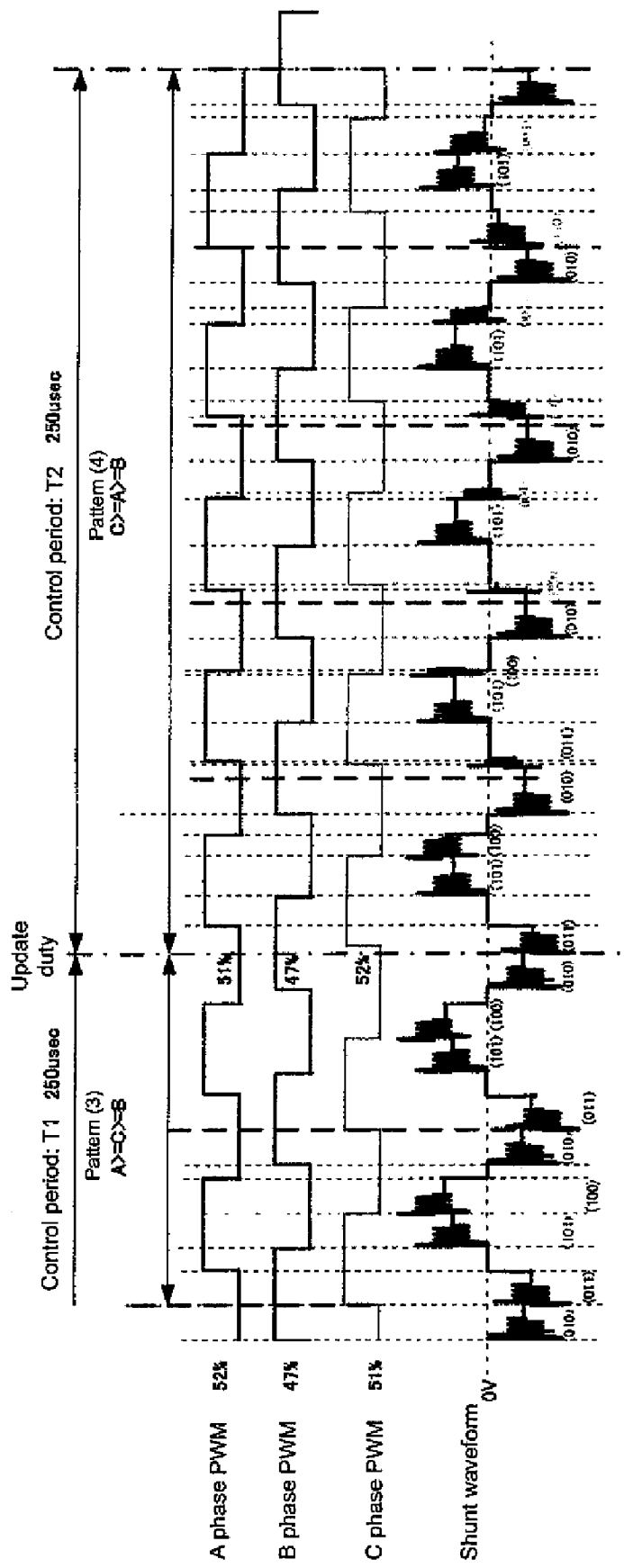
FIG. 7 shows a timing chart in cases where two phases are not detectable, and the pattern is changed, and a shunt waveform.
Figure 8:
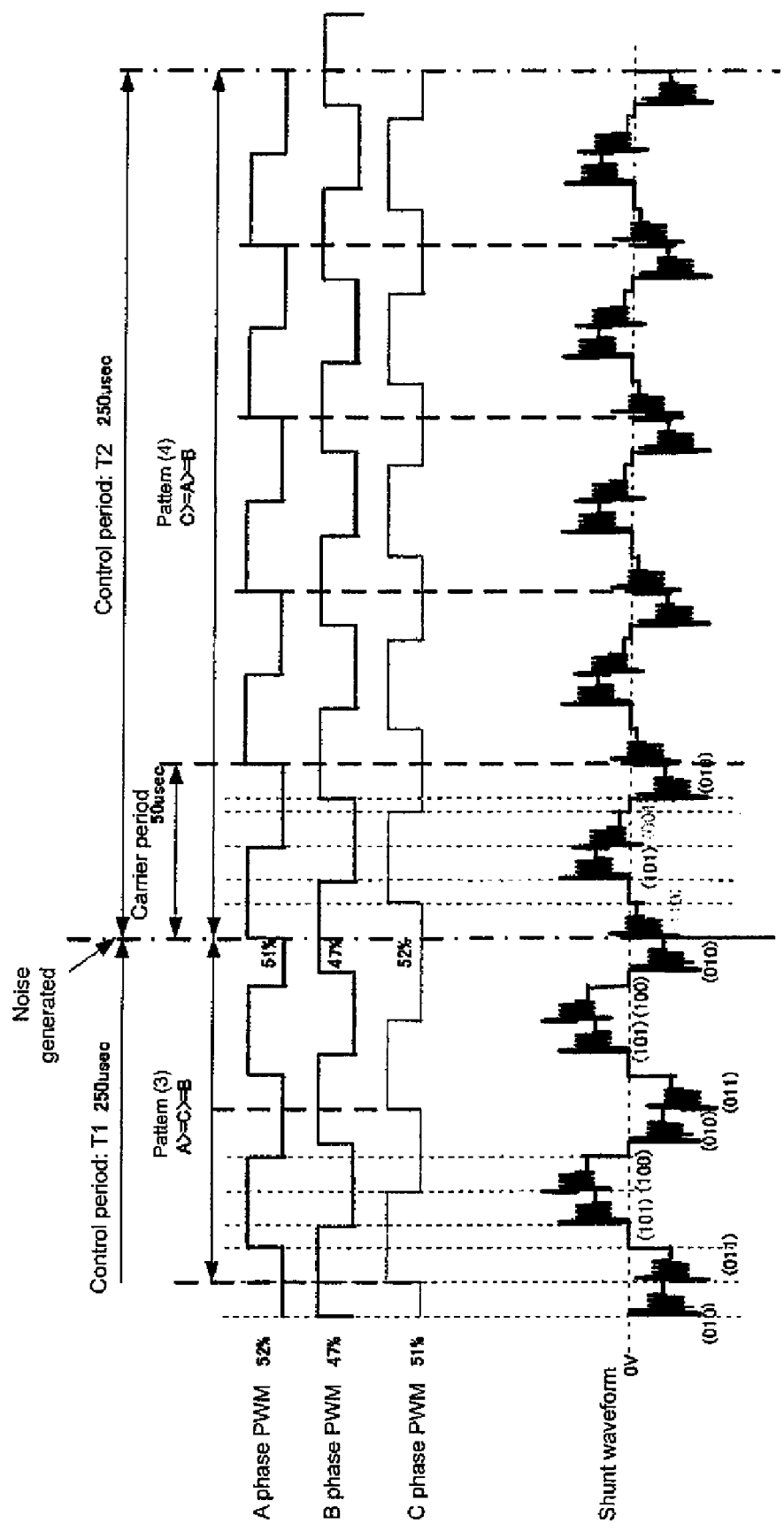
FIG. 8 shows a timing chart in a case where two phases are not detectable in a comparison example.

FIG. 7 shows a diagram showing a timing chart in cases where two phases are both not detectable, and the pattern is changed, and a shunt waveform. The switching timing of the PWM signals of the A phase, the B phase, and the C phase other than the portion showing the shunt waveform are the same as FIG. 5, and thus the description thereof will not be given. With regards to the shunt waveform, the current of the A phase and the −B phase is shown in the control period T1 of the previous time, and the current of the C phase and the −B phase is shown in the control period T2 of this time. As apparent from such shunt waveform, according to the controller of the multi-phase electric motor according to one or more embodiments of the present invention, the PWM signal of the predetermined phase is moved by gradually changing the movement amount of the phase in one control period, and thus the sudden current change is suppressed at the time of the end of the control period T1 of the previous time, that is, the start time of the control period T2 of the present time, and the amount of change is dispersed over five periods. Therefore, the period of the current ripple by switching does not become the same as the control cycle time 250 μsec of one control period, and is about plus or minus a few % of the 50 μsec of the carrier period of the saw-tooth signal, and the frequency corresponding to such a period is not included in the audible region. Therefore, the generation of noise can be prevented.

The method according to one or more embodiments of the present invention can be applied even when the triangular signal is used, similar to the case of the saw-tooth signal described above. In other words, by shifting the PWM signal of each phase so as to gradually change in the period of five periods of each control period, the frequency of the current ripple by switching based on the PWM signal is not included in the audible region, and the generation of noise can be prevented, and the current value of each phase can be detected at satisfactory precision for every control period using the single current detection section.

In the present invention, various embodiments other than the above may be adopted. For instance, the configuration of one control period is five periods in the above embodiment, but may be a period shorter than or longer than five periods. The movement amount of the phase is gradually changed by being equally divided by five, but the difference in the movement amount in each period may not be equal, and the movement amount may be determined by changing the weight in each period.

The FET is used for the upper arm switching element and the lower arm switching element in the above embodiment, but other switching element such as an IGBT (Insulated Gate Bipolar mode Transistor) may be used. Furthermore, the current detection section may adopt a configuration other than that shown in the embodiment, and may be arranged between the power supply and the FET bridge.

A brushless motor is described as a multi-phase electric motor by way of example, but one or more embodiments of the present invention can be applied to the general controller for controlling the electric motor including a plurality of phases such as induction motor and synchronous motor.

What is claimed is:

1. A controller of a multi-phase electric motor comprising:
   a drive section, comprising an upper arm switching element and a lower arm switching element, for driving the multi-phase electric motor;
   a single current detection section for detecting a current value of the multi-phase electric motor;
   a pulse width modulation signal generation section for generating plural pulse width modulation of each phase within one control period based on the current value detected by the current detection section and a carrier signal; and
   a phase movement section for moving the pulse width modulation signal of a predetermined phase generated by the pulse width modulation signal generation section by gradually changing a movement amount of the phase in one control period, and outputting the resultant pulse width modulation signal to the drive section,
   wherein, if a movement amount of the phase of the predetermined phase in a control period immediately before is zero and a movement amount of the phase of the predetermined phase in a control period of this time is not zero, the phase movement section gradually increases a shift amount from zero in the control period of this time.

2. The controller of the multi-phase electric motor according to claim 1, further comprising:
   a current detectability determination section for determining whether the current value is detectable in the current detection section based on the pulse width modulation signal of each phase generated by the pulse width modulation signal generation section;
   wherein the phase movement section moves the pulse width modulation signal of the predetermined phase generated by the pulse width modulation signal generation section when the current detectability determination section determines that the current is not detectable.

3. The controller of the multi-phase electric motor according to claim 2, further comprising:
   a switching number determination section for determining whether a number of the upper arm switching element to turn ON is an even number or an odd number when the current detectability determination section determines that the current is not detectable;
   wherein the phase movement section moves the phase of the pulse width modulation signal of the predetermined phase generated by the pulse width modulation signal generation section based on the determination result of the switching number determination section.

4. The controller of the multi-phase electric motor according to claim 1, further comprising a current detection period determination section for determining a current detection period of the current detection section based on a time the pulse width modulation signal of each phase changes in the last period of the control period.

5. A controller of a multi-phase electric motor comprising:
   a drive section, comprising an upper arm switching element and a lower arm switching element, for driving the multi-phase electric motor;
   a single current detection section for detecting a current value of the multi-phase electric motor;
   a pulse width modulation signal generation section for generating plural pulse width modulation of each phase within one control period based on the current value detected by the current detection section and a carrier signal; and
   a phase movement section for moving the pulse width modulation signal of a predetermined phase generated by the pulse width modulation signal generation section by gradually changing a movement amount of the phase in one control period, and outputting the resultant pulse width modulation signal to the drive section,
   wherein, if a movement amount of the phase of the predetermined phase in a control period immediately before is not zero and a movement amount of the phase of the predetermined phase in a control period of this time is zero, the phase movement section gradually decreases a shift amount to zero in the control period of this time.

6. The controller of the multi-phase electric motor according to claim 5, further comprising:
   a current detectability determination section for determining whether the current value is detectable in the current detection section based on the pulse width modulation signal of each phase generated by the pulse width modulation signal generation section;
   wherein the phase movement section moves the pulse width modulation signal of the predetermined phase generated by the pulse width modulation signal generation section when the current detectability determination section determines that the current is not detectable.

7. The controller of the multi-phase electric motor according to claim 6, further comprising:
   a switching number determination section for determining whether a number of the upper arm switching element to turn ON is an even number or an odd number when the current detectability determination section determines that the current is not detectable;

wherein the phase movement section moves the phase of the pulse width modulation signal of the predetermined phase generated by the pulse width modulation signal generation section based on the determination result of the switching number determination section.

8. The controller of the multi-phase electric motor according to claim 5, further comprising a current detection period determination section for determining a current detection period of the current detection section based on a time the pulse width modulation signal of each phase changes in the last period of the control period.

* * * * *